United States Patent
McVicker

(10) Patent No.: US 8,438,230 B2
(45) Date of Patent: May 7, 2013

(54) METHOD AND SYSTEM FOR CONTEXTUAL MESSAGING AS UTILIZED FOR DECISION SUPPORT

(75) Inventor: Wayne McVicker, Los Alto Hills, CA (US)

(73) Assignee: Attainia, Inc., Mountain View, CA (US)

( * ) Notice: Subject to any disclaimer, the term of this patent is extended or adjusted under 35 U.S.C. 154(b) by 110 days.

(21) Appl. No.: 12/250,439

(22) Filed: Oct. 13, 2008

(65) Prior Publication Data

US 2009/0100140 A1 Apr. 16, 2009

Related U.S. Application Data

(60) Provisional application No. 60/979,770, filed on Oct. 12, 2007, provisional application No. 60/979,764, filed on Oct. 12, 2007.

(51) Int. Cl.
*G06F 15/16* (2006.01)
*G06F 3/00* (2006.01)

(52) U.S. Cl.
USPC .......................................... 709/206; 715/738

(58) Field of Classification Search .................. 709/206; 715/733, 738
See application file for complete search history.

(56) References Cited

U.S. PATENT DOCUMENTS

| | | | |
|---|---|---|---|
| 7,224,957 B2 * | 5/2007 | Spector | 455/404.2 |
| 2003/0145058 A1 * | 7/2003 | Chan et al. | 709/206 |
| 2004/0122835 A1 | 6/2004 | McKibben et al. | |
| 2005/0234893 A1 * | 10/2005 | Hirsch | 707/3 |
| 2006/0039030 A1 * | 2/2006 | Peterschmidt | 358/1.15 |
| 2006/0095514 A1 | 5/2006 | Wang et al. | |
| 2007/0135099 A1 * | 6/2007 | Taylor et al. | 455/412.1 |
| 2007/0226032 A1 | 9/2007 | White et al. | |
| 2008/0307058 A1 * | 12/2008 | Brunswig et al. | 709/206 |

OTHER PUBLICATIONS

WIPO PCT/US2008/079747 International Search Report and Written Opinion dated Dec. 22, 2008.

* cited by examiner

*Primary Examiner* — Jeong S Park
(74) *Attorney, Agent, or Firm* — Vierra Magen Marcus LLP

(57) ABSTRACT

A method and system for contextual messaging as utilized for decision support is disclosed. According to one embodiment, a computer-implemented method, comprises receiving and storing information from an administrative client that establishes memberships of a plurality of clients to a common contextual messaging system. Nomenclature information is received from the administrative client that establishes a nomenclature for the common contextual messaging system. A first client of the plurality of clients is permitted to accessing a contextual messaging host server via a web browser associated with the first client. A message is received from the first client. A message context is determined for the message using the nomenclature information. Messages are clustered based on the message context in a message database.

21 Claims, 14 Drawing Sheets

| | | | Category | | Manufacturer | Model 507 |
|---|---|---|---|---|---|---|
| 509 | | | Bed, Electric | | Manufacturer | VersaCare w/Air |
| | | | Bed, Electric | | Hill-Rom Bed & Stretcher | VersaCare w/Foam |
| ☑ | | Ⓒ | Bed, Electric | Ⓜ | Kinetic Concepts, Inc. | KinAir MedSurg |
| ☑ | | Ⓒ 510 | tric 511 | | Kinetic Concepts, Inc. | TheraPulse |
| ☐ | | | tric | | Kinetic Concepts, Inc. | TheraPulse |
| ☐ | | | Bed, Electric | Ⓜ | Stryker Medical | Acute Care Bed |
| ☐ | | | Bed, Electric | | | |

511:
3 Unread Messages
7 Total Messages
3 Internal Messages
2 Supplier Messages
1 Group Buy
1 ECRI HPCS Report 501 Summary
502 Items
503 Products
504 Lists View Similar: Bed, Electric ▽   508   New...   ☑ Wrap Text Bed, Electric > All Suppliers Messages Messages: (6)  601

| Subject | From | Org | Type | Status | Posted |
|---|---|---|---|---|---|
| New STERIS Surgical Suite Standard | Joe Smith | St. Bernard Medical Center | Category - Message | Unread | 04-16-07 |
| STERIS Has Assigned New Rep for SBHS | Anita Lopez | Stroud Amulatory Care | Supplier - Message | Unread | 04-13-07 |
| 123ABC Has Been Discontinued | Bob Baker | STERIS Corporation | Product - Discontinued | Unread | 04-24-07 |
| STERIS SRT 128 should no longer be specified | Brian Jones | St. Bernard Medical Center | Product - Message | Read | 03-22-07 |
| Novation Group Buy - GE CT Scanners | Denise Rubin | Novation | Category - Group Buy | Draft | 09-01-06 |
| XYI Surgical Lighting System Just Released | Marge Simpson | STERIS Corporation | Product - New Release | Read | 02-10-06 |

Edit    Delete

Info  602

Novation  603

Supplier:
GE Healthcare, Imaging Systems  604     607

Scope:
Categories:
CT Scanner, Cardiac Cath
CT Scanner, Electron Beam
CT Scanner, Mobile
CT Scanner, Mobile, Digital
CT Scanner, Multislice Subject:
Novation Group Buy - GE CT Scanners  605

Details:
Start Date: 09/01/07      End Date: 12/01/07
Contact: Denise Ruben    Phone: 212-555-1212 x1234  606
Sign Up: http://www.norationco.com/groupbuy Notes:
Models: LightSpeed VCT - S7864C
Visit Website to sign up now or for more information    608

FIG. 6

Messages

Messages: (6) _701_

| Subject | From | Org | Type | Posted |
|---|---|---|---|---|
| New STERIS Surgical Suite Standard | Joe Smith | St. Bernard Medical Center | Category - Message | 04-16-07 |
| STERIS Has Assigned New Rep for SBHS | Anita Lopez | Stroud Amulatory Care | Supplier - Message | 04-13-07 |
| 123ABC Has Been Discontinued | Bob Baker | STERIS Corporation | Product - Discontinued | 04-24-07 |
| STERIS SRT 128 should no longer be specified | Brian Jones | St. Bernard Medical Center | Product - Message | 03-22-07 |
| Novation Group Buy - GE CT Scanners | Denise Rubin | Novation | Category - Group Buy | 09-01-06 |
| XYI Surgical Lighting System Just Released | Marge Simpson | STERIS Corporation | Product - New Release | 02-10-06 |

[Edit] [Delete]

Info _702_

STERIS  _703_

Supplier:
STERIS Corporation  _704_

Discontinued Product:
Previous Model: 123ABC
Data PDF: 📄   Mktg PDF: 📄   _707_

Suggested Replacement:
New Model: 987CBA
Data PDF: 📄   Mktg PDF: 📄   _708_

Subject:
123ABC Has Been Discontinued  _705_

Notes:
Replaced due to digital upgrade.  _706_

Action:

[Replace in Current Project *]   [Add to My Watch List]  _709_   [Replace in Selected Projects *]

[Revert to Unspecified in Current Project *]   [Revert to Unspecified in Selected Projects *]

*Items with a status of Existing or Purchased will not be replaced.*

FIG. 7

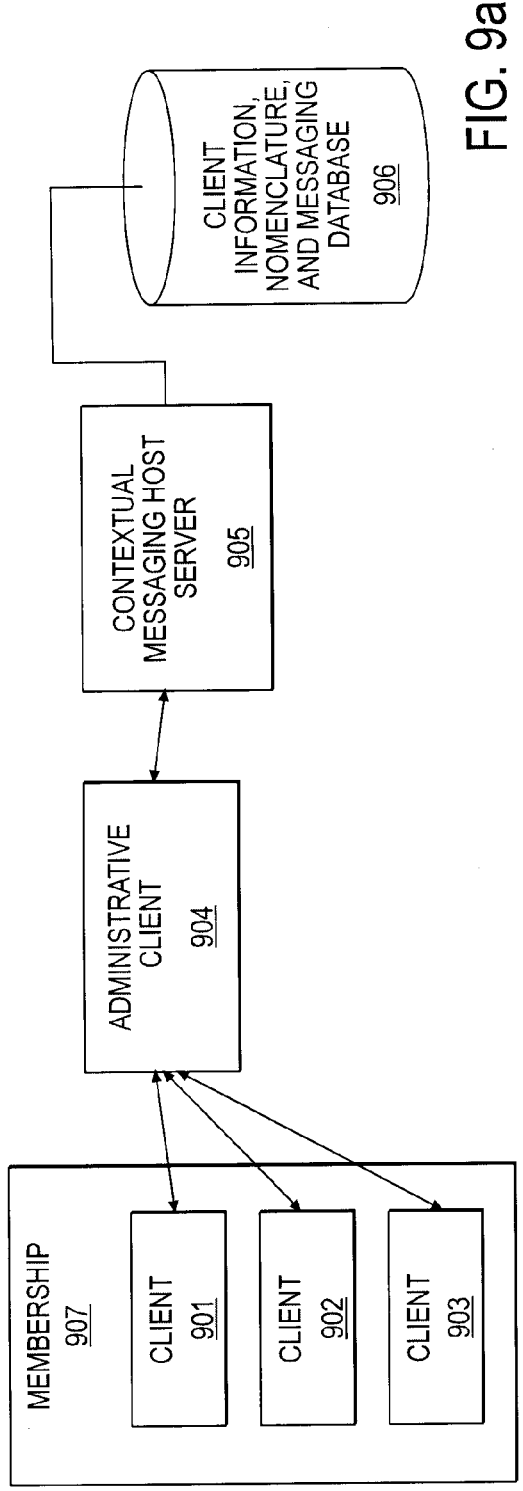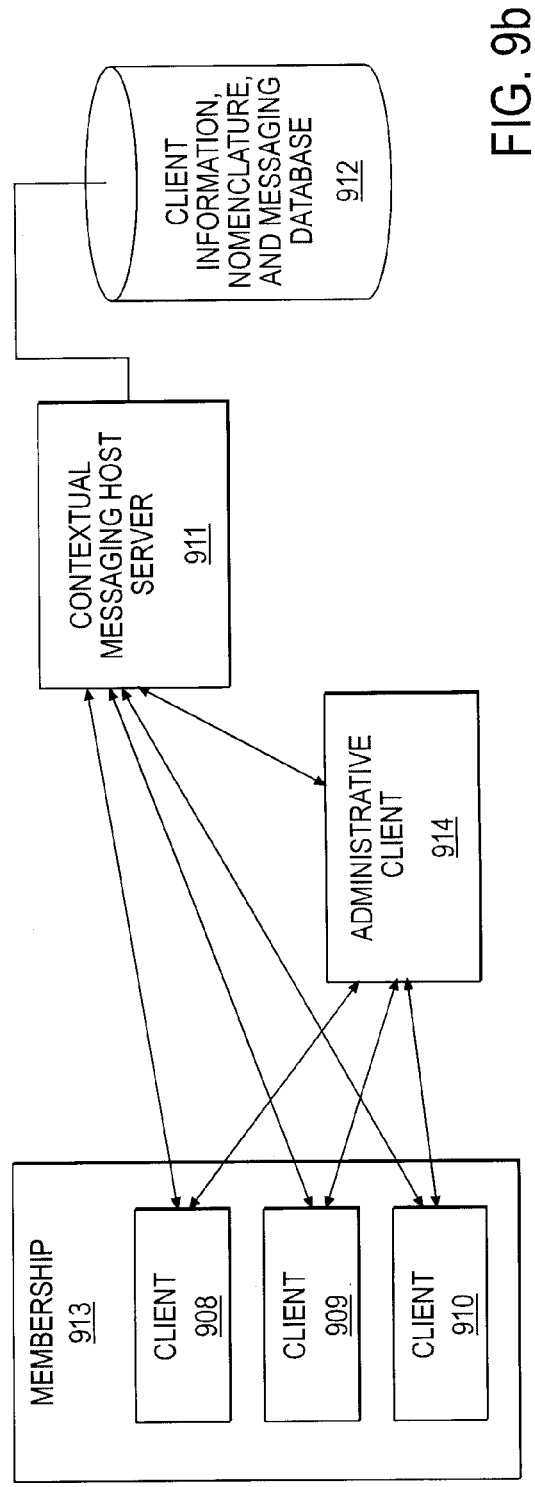
FIG. 9a
FIG. 9b

METHOD AND SYSTEM FOR CONTEXTUAL MESSAGING AS UTILIZED FOR DECISION SUPPORT

The present application claims the benefit of and priority to U.S. Provisional Patent Application No. 60/979,770 entitled "Contextual Messaging System as Utilized for Decision Support" and filed on Oct. 12, 2007, and to U.S. Provisional Patent Application No. 60/979,764 entitled "Culturally Modeled Consensus Factor as Utilized for the Determination of Acquisition Prioritization" and filed on Oct. 12, 2007, and are hereby, incorporated by reference.

FIELD

The present invention relates to the field of computer systems. In particular the present invention discloses a method and system for contextual messaging as utilized for decision support.

BACKGROUND

Collaboration in the workplace is critical for the success of an organization, and with the increase in electronic communication there is a growing need for message management. Conventional peer-to-peer messaging and social networking do not have optimal contextual support for organization of messages, actions, and decisions within the workplace. Peer-to-peer or peer-to-topic messaging systems host and convey topic-based communications. The primary limitation of these systems is the diminishing return of these systems as more users "clutter" the system with increasingly irrelevant content.

SUMMARY

A method and system for contextual messaging as utilized for decision support is disclosed. According to one embodiment, a computer-implemented method, comprises receiving and storing information from an administrative client that establishes memberships of a plurality of clients to a common contextual messaging system. Nomenclature information is received from the administrative client that establishes a nomenclature for the common contextual messaging system. A first client of the plurality of clients is permitted to accessing a contextual messaging host server via a web browser associated with the first client. A message is received from the first client. A message context is determined for the message using the nomenclature information. Messages are clustered based on the message context in a message database.

BRIEF DESCRIPTION OF DRAWINGS

The accompanying drawings, which are included as part of the present specification, illustrate the presently preferred embodiment of the present invention and together with the general description given above and the detailed description of one embodiment given below serve to explain and teach the principles of the present invention.

FIG. 1 is an exemplary user interface for a contextual messaging system, according to one embodiment.

FIG. 5 is an exemplary user interface for accessing messages within a contextual messaging system, according to one embodiment.

FIG. 6 is an exemplary message context box within a contextual messaging system, according to one embodiment.

FIG. 7 is an exemplary message context box with multiple actions within a contextual messaging system, according to one embodiment.

FIG. 9a is an exemplary system level diagram of membership establishment in a contextual messaging system, according to one embodiment.

FIG. 9b is an exemplary system level diagram of a contextual messaging system, according to one embodiment.

DETAILED DESCRIPTION

Figure 2:
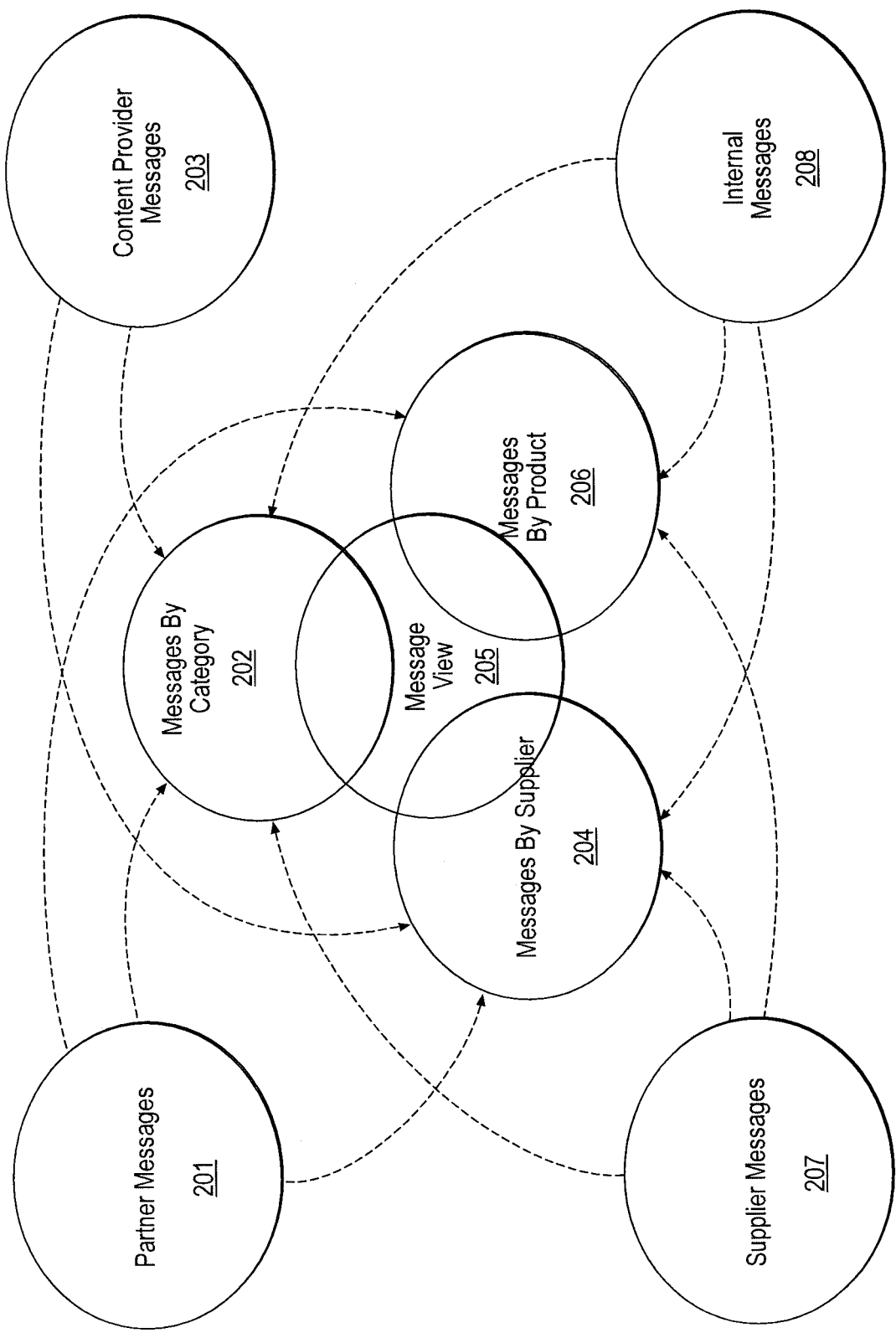
FIG. 2 is a diagram depicting exemplary message views within a contextual messaging system, according to one embodiment.

A method and system for contextual messaging as utilized for decision support is disclosed. According to one embodiment, a computer-implemented method, comprises receiving and storing information from an administrative client that establishes memberships of a plurality of clients to a common contextual messaging system. Nomenclature information is received from the administrative client that establishes a nomenclature for the common contextual messaging system. A first client of the plurality of clients is permitted to accessing a contextual messaging host server via a web browser associated with the first client. A message is received from the first client. A message context is determined for the message using the nomenclature information. Messages are clustered based on the message context in a message database.

A contextual messaging system (CMS) enables users within an interrelated business community to communicate actionable messages centered on a common nomenclature. Unlike most messaging systems, CMS is not a peer-to-peer system. Nor is it an open or closed forum for user comments. As such, the distracting and cluttered nature of social networking systems is avoided, leading to greater utilization within a professional environment. Rather, it is a system for delivering business-rule driven, contextually clustered messaging documents in a network of related, but separate organizations. These message documents can contain relevant, programmatic actions and are delivered via message views based on the application context.

Figure 1:
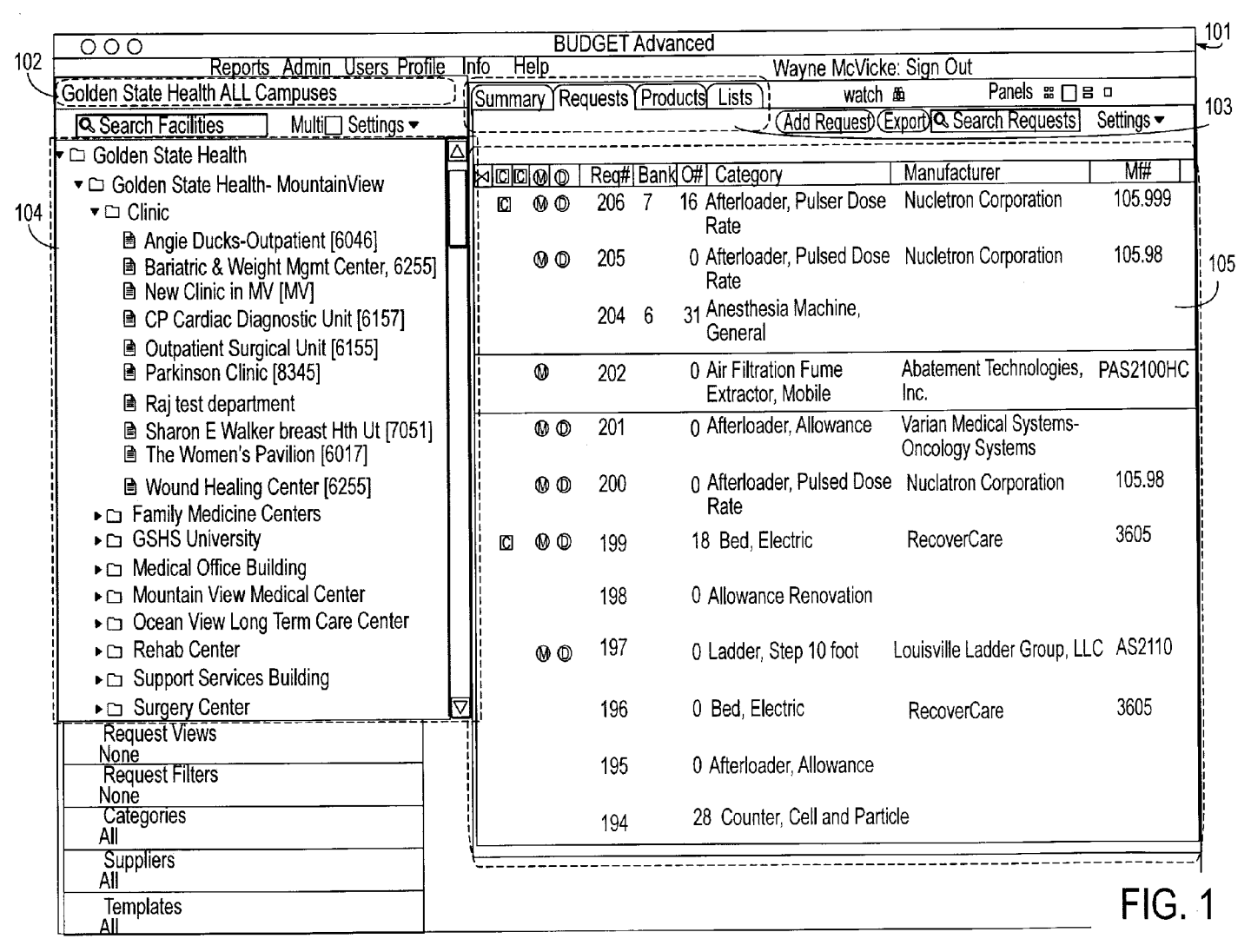

FIG. 1 is an exemplary user interface for a contextual messaging system, according to one embodiment. A user interface 101 allows a user to login and access messages according to a variety of contexts. A user may view messages for a particular client 102 for example, and messages are sorted 104 based on several set rules. The user may select the appropriate tab 103 for what message view is desired, and messages will be displayed in a list 105 accordingly.

FIG. 9a is an exemplary system level diagram of membership establishment in a contextual messaging system, according to one embodiment. In one embodiment, an administrative client 904 completes a subscription process to gain access to a contextual messaging application which resides on a contextual messaging host server 905. Accessing the contextual messaging host server 905 via any web browser or other client technology over the internet, the administrative client establishes a membership 907 of clients 901, 902, 903 which may access the contextual messaging application from their respective systems. The client 901, 902, 903 systems can be computers or any other input-output devices.

The contextual messaging host server 905 stores information received from the administrative client 904 in the client information, nomenclature and messaging database 906. Nomenclature, as referred to here, is the information used by the present system to determine a message's context. The client information, nomenclature and messaging database 906 is depicted as separate from the contextual messaging host server 905 in this example, but they may also reside on the same system in another embodiment.

FIG. 9b is an exemplary system level diagram of a contextual messaging system, according to one embodiment. Once the administrative client 914 has established a membership 913, any client 908, 909, 910 in the membership 913, as well as the administrative client 914, may access the contextual messaging application residing on the contextual messaging host server 911. The contextual messaging host server 911 communicates with and receives information from the client information, nomenclature and messaging database 912. The client information, nomenclature and messaging database 912 is depicted as separate from the contextual messaging host server 911 in this example, but they may also reside on the same system in another embodiment.

FIG. 2 is a diagram depicting exemplary message views within a contextual messaging system, according to one embodiment. How a user views a message 205 (how the message is displayed to the user) is determined by the current context and the messaging rules established by user permissions, message categorization, the relationship of the message source organization and user-specific message flags. The current context is based upon where a message is selected from within a software application, for example the context is supplier if a user is accessing information based on a particular supplier and wants to view related messages.

In one embodiment, message types can be flagged as being relevant to a broad range of user organizations if they meet specific permission criteria, such as a current subscription to a content source or membership within the source organization. Upon creation, messages are normalized to a particular organizational scheme. Messages are created at the partner 201 level, supplier 207 level, the content provider 203 level, and at the internal 208 level. In these examples, messages are assigned to either a category 202, a group of categories, a particular supplier 204, or a particular product 206.

Each message type has a message domain. For example, internal messages 208 are only available to users belonging to the same organization as the user that created the message. Messages can only be deleted from the messaging network by their creator or by expiration rules established by the message creator or message type. However, any user can flag most messages to be removed from their message queue. This removes the message from all of their message views in all relevant applications, but will not affect any other users' view of the same message. Thus, over time, and with minimum intrusion, each user develops his or her unique and continuously evolving, contextual view of these diverse sources of relevant information.

FIGS. 3a-3f are exemplary block and flow diagrams depicting message creation in a contextual messaging system, according to one embodiment. In one embodiment, four types of organizations, each with a unique set of message delivery rules, can create messages and submit the messages in each of three primary normalization types. As an example the normalization types may be category 324, supplier 313 or product 301. Normalization type category 324 may include messages related to any category of topics other than those related to suppliers 313 or products 301. The type supplier 313 might include everything related to a particular supplier or suppliers in general, and the type product 301 might include any topic related to a particular product or products in general. Who can create and edit these messages is determined by administratively controlled user-level permissions. Messages are categorized by authorized message creators, which establish the context of a message. The scope of these selections vary with each organization type. Decision making throughout the message creation process takes place on the contextual messaging host server 911, according to one embodiment.

Figure 3A:
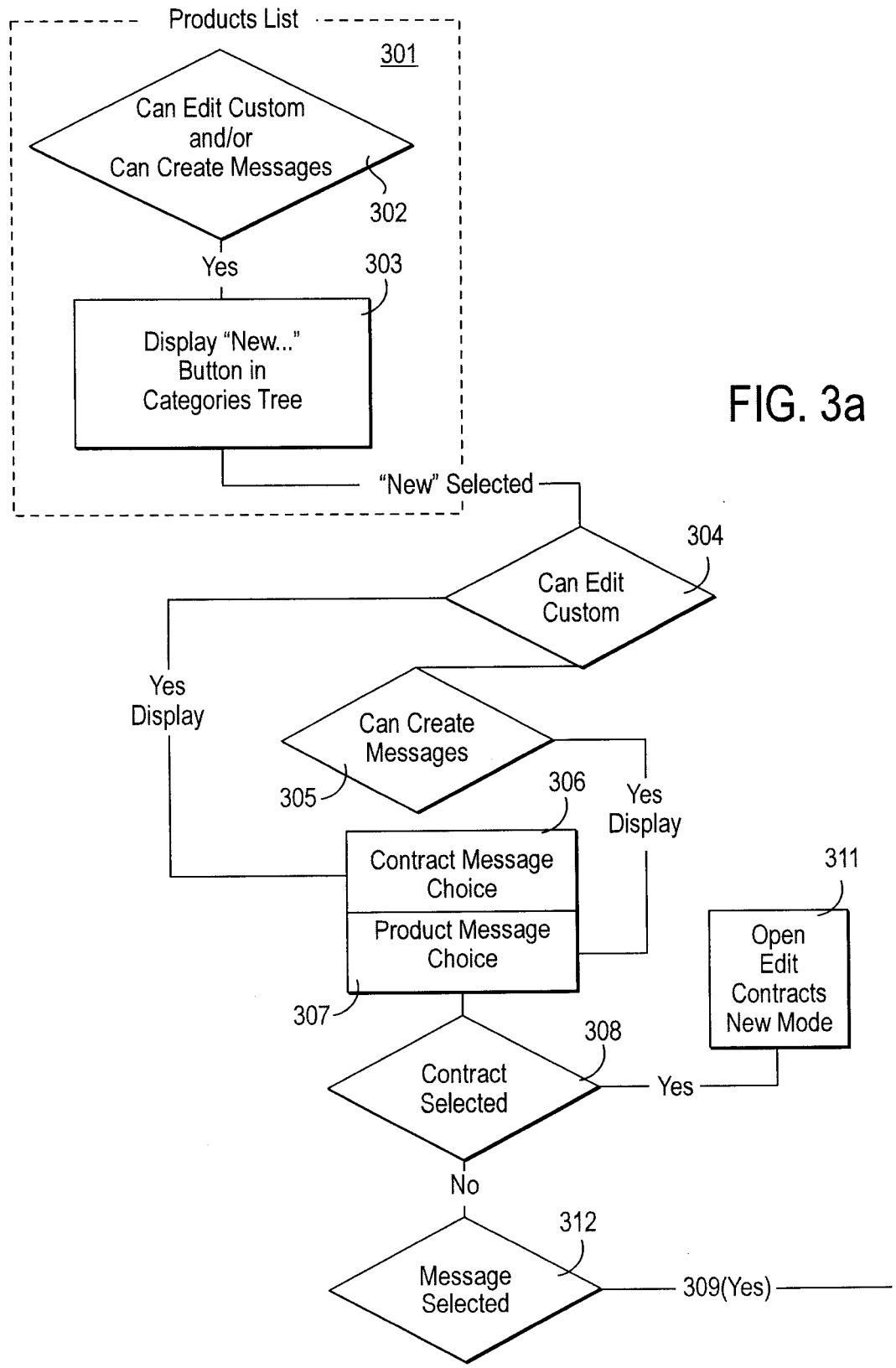
FIG. 3a is an exemplary block and flow diagram depicting message creation from a products list in a contextual messaging system, according to one embodiment.

FIG. 3a is an exemplary block and flow diagram depicting message creation from a products list in a contextual messaging system, according to one embodiment. The flow begins with whether or not a user is allowed to edit custom and/or create messages 302, and if so a "new" button is displayed in a categories tree 303. Once "new" is selected, depending on whether editing custom 304 or creating message 305 are allowed, a contract message choice 306 and/or product message choices 307 are displayed to the user. A contract message 306 can be a message related to a product contract. A product message 307 can simply be any message about a product or products in general. If a contract is selected 308, a new mode is opened to allow for editing contracts 311. If a contract is not selected 308, and a message is selected 312, then a popup is displayed 309 for editing/adding new messages. The flow from here continues in the description of FIG. 3b.

Figure 3B:
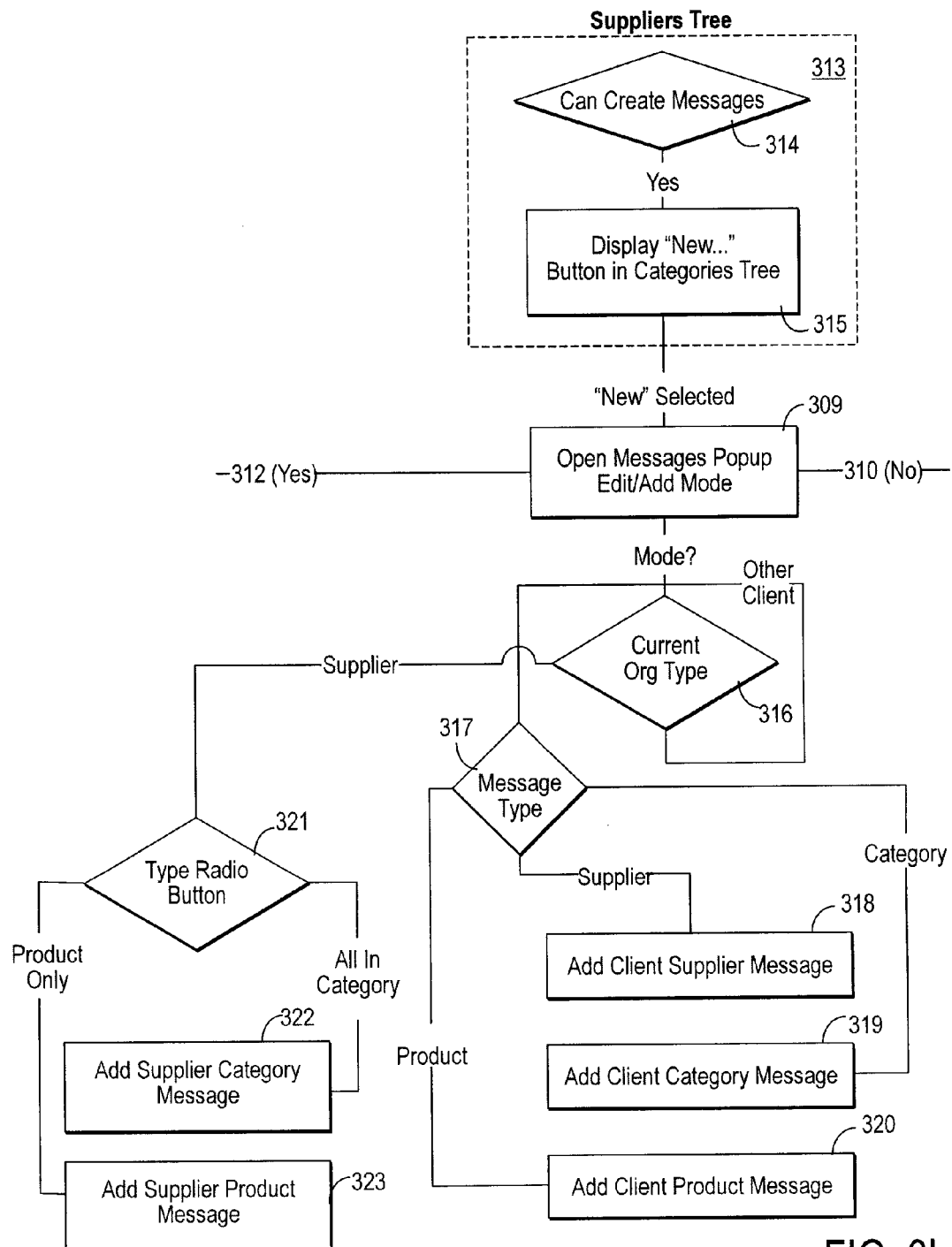
FIG. 3b is an exemplary block and flow diagram depicting message creation from a suppliers tree in a contextual messaging system, according to one embodiment.

FIG. 3b is an exemplary block and flow diagram depicting message creation from a suppliers tree in a contextual messaging system, according to one embodiment. The flow begins if creating messages 314 is allowed, and if so a "new" button is displayed in a categories tree 315. Once "new" is selected, a popup is displayed 309 for editing/adding new messages. The current organization type 316 is evaluated, and if the organization is a supplier then a type radio button 321 is displayed. Depending on the user selection, either a supplier category message 322 or a supplier product message 323 is added. If current organization type evaluation 316 reveals it is a client, then the message type 317 will be selected. Depending on the type selected either a client supplier 318, client category 319, or client product 320 message is added.

Figure 3C:
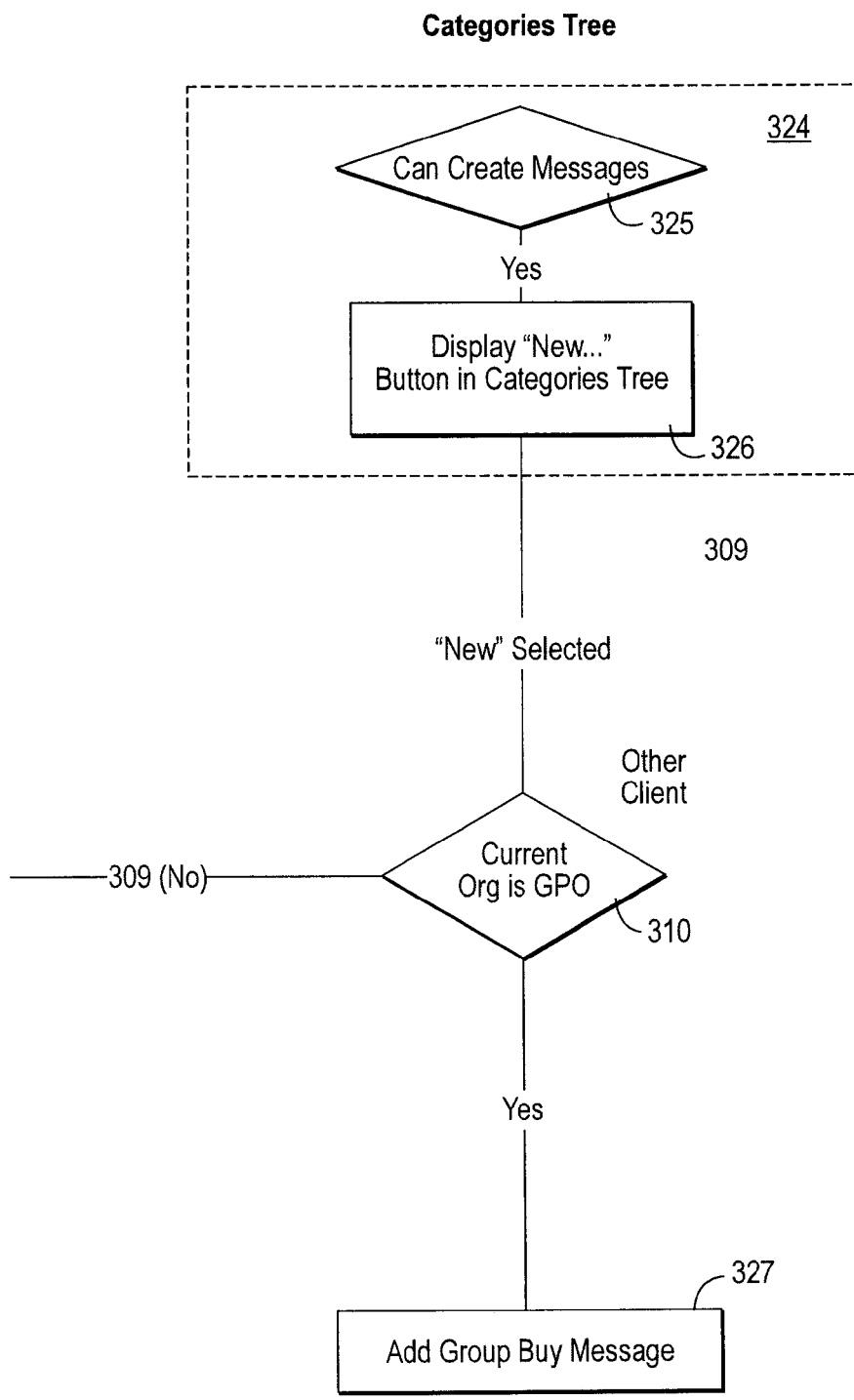
FIG. 3c is an exemplary block and flow diagram depicting message creation from a categories tree in a contextual messaging system, according to one embodiment.

FIG. 3c is an exemplary block and flow diagram depicting message creation from a categories tree in a contextual messaging system, according to one embodiment. The flow begins if creating messages 325 is allowed, and if so a "new" button is displayed in a categories tree 326. Once "new" is selected, the current organization is evaluated 310. The current organization might be, as an example, a group purchasing organization. A group purchasing organization can be an organization that is responsible for all purchasing for a given group. If the current organization is a group purchasing organization, then a group buy message 327 is added. If not then a popup is displayed 309 for editing/adding new messages and the flow continues as described in FIG. 3b above.

Figure 3D:
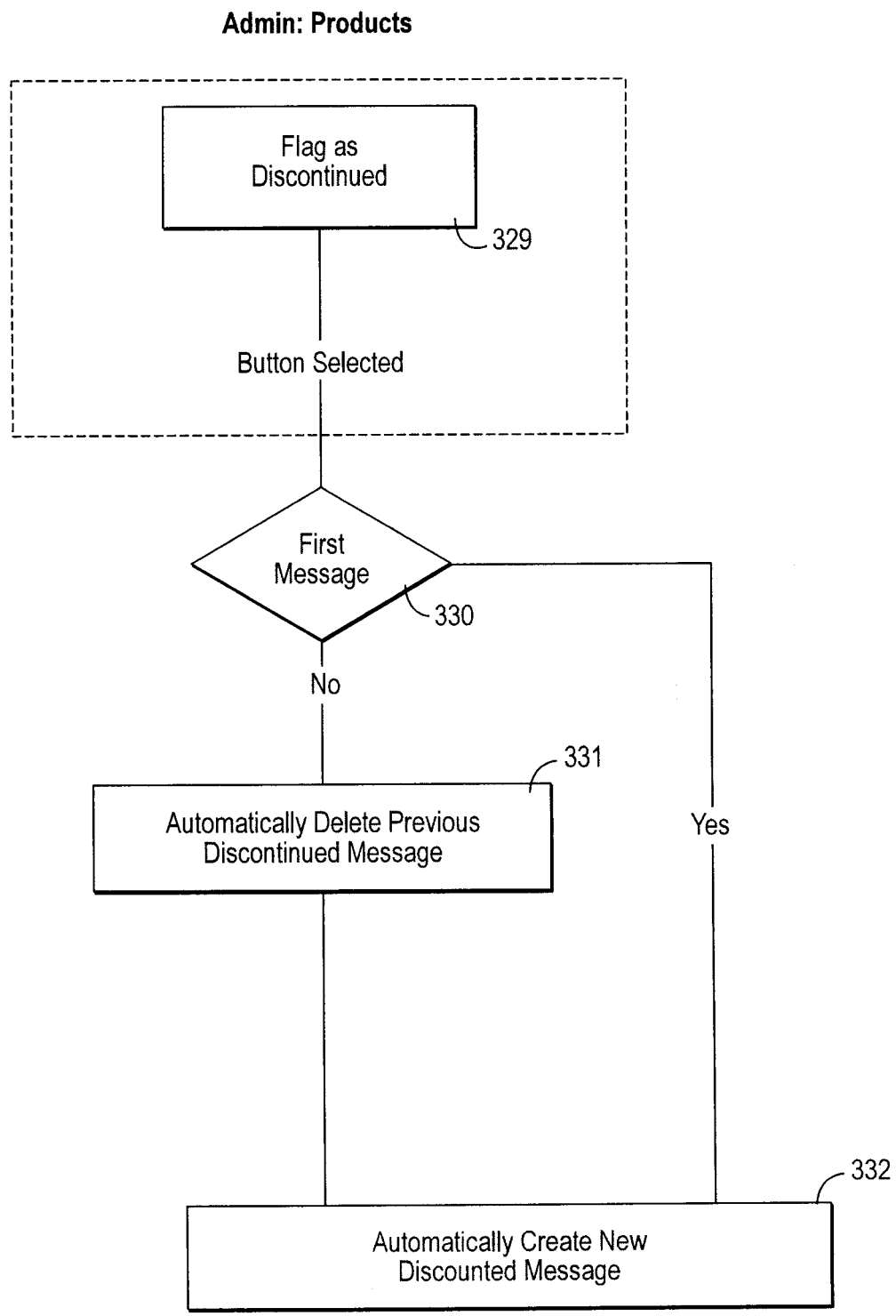
FIG. 3d is an exemplary block and flow diagram depicting message creation relating to product discontinuation by a product administrator in a contextual messaging system, according to one embodiment.

FIG. 3d is an exemplary block and flow diagram depicting message creation relating to product discontinuation by a product administrator in a contextual messaging system, according to one embodiment. If a product is to be discontinued, it is flagged 329. If the message is the first message 330 related to this product discontinuation then a new discontinued message is automatically created 332. Otherwise any previous discontinued messages are deleted 331 before automatically creating a new discontinued message 332.

Figure 3E:
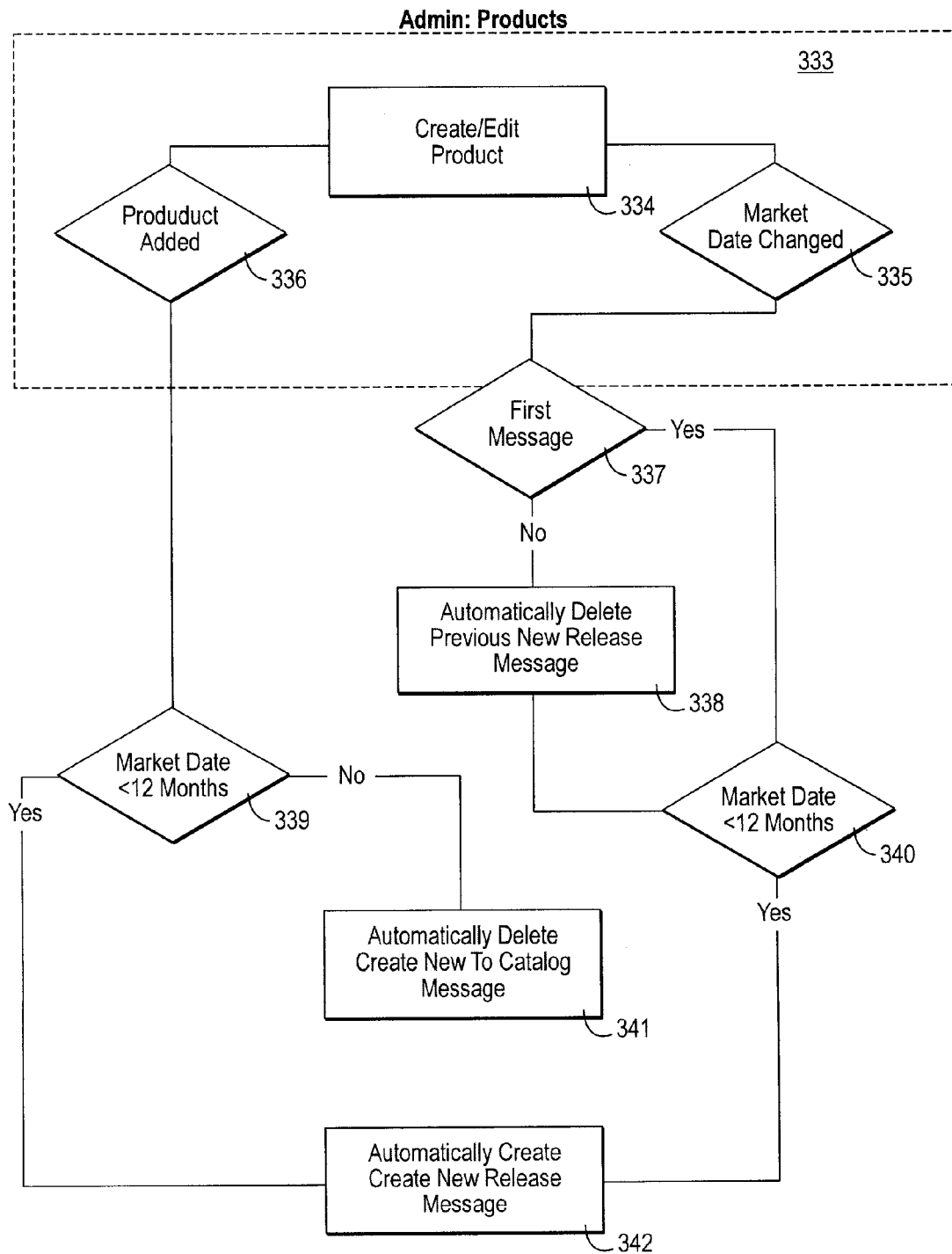
FIG. 3e is an exemplary block and flow diagram depicting message creation relating to product editing or deletion by a product administrator in a contextual messaging system, according to one embodiment.

FIG. 3e is an exemplary block and flow diagram depicting message creation relating to product editing or deletion by a product administrator in a contextual messaging system, according to one embodiment. A product can be created or edited 334. If a product is being created or added 336, and the market date is within 12 months 339 then a new release message 342 is automatically created. If the market date is not within 12 months 339 then a new message to catalog is automatically created 341. If the product is not new, then the product has already been created and just needs to be edited, as an example the market date may have changed 335. If the new message to be created is the first message 337 and the market date is within 12 months 340 then a new release message is automatically created 342. If the message is not the first, then previous new release messages are deleted 338, and if the market date is within 12 months 340 a new release message is automatically created 342.

Figure 3F:
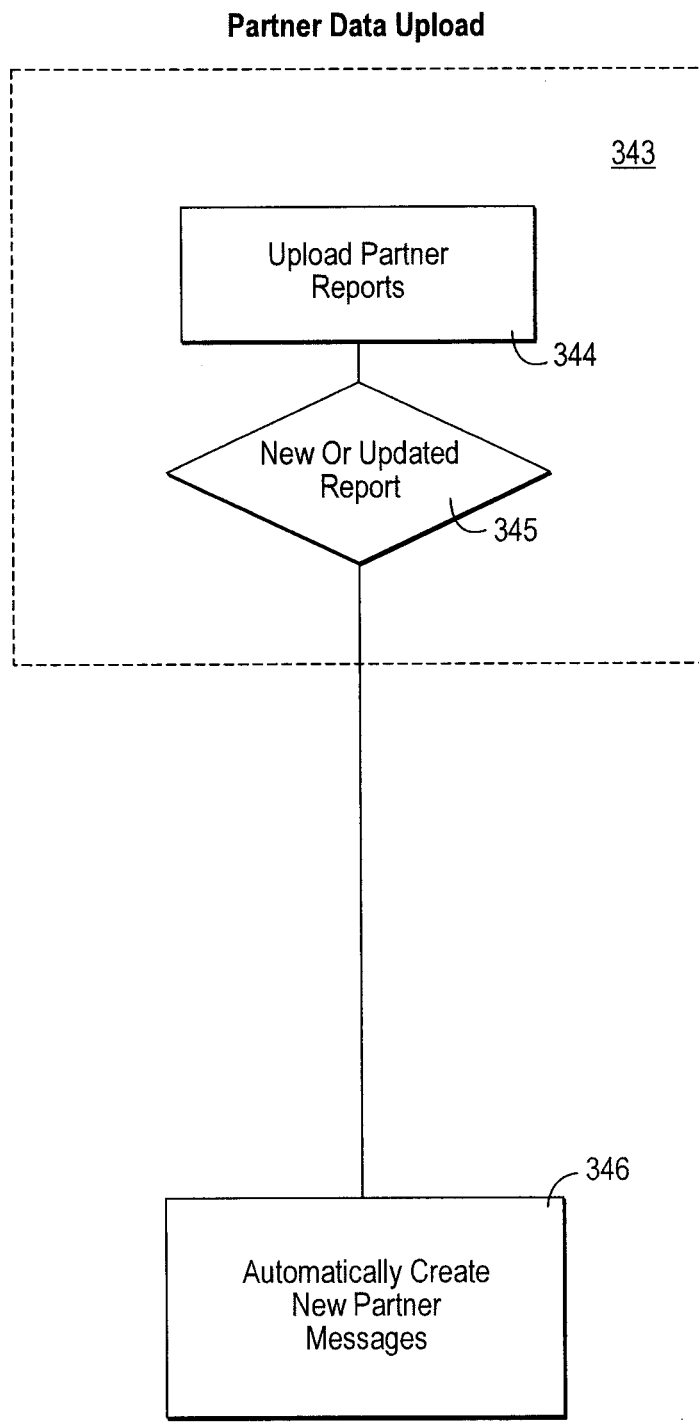
FIG. 3f is an exemplary block and flow diagram depicting message creation related to partner data upload in a contextual messaging system, according to one embodiment.

FIG. 3f is an exemplary block and flow diagram depicting message creation related to partner data upload in a contextual messaging system, according to one embodiment. Partner reports are uploaded 344, and whether or not the report is new or updated 345 a new partner message is automatically created 346.

Figure 4:
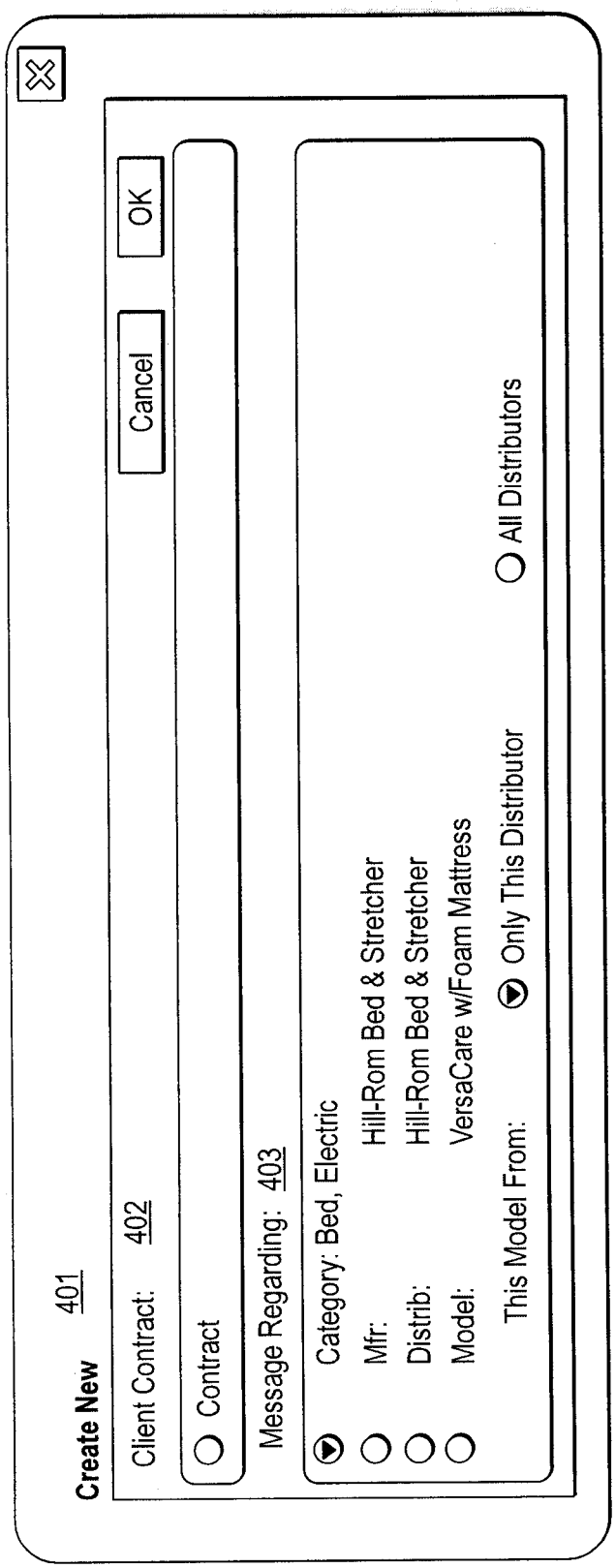
FIG. 4 is an exemplary user interface for message creation within a contextual messaging system, according to one embodiment.

FIG. 4 is an exemplary user interface for message creation within a contextual messaging system, according to one embodiment. A user may create a new 401 message utilizing selections within the interface. The selections may include client contract 402, as well as set subjects according to the particular client in a message regarding box 403.

FIG. 5 is an exemplary user interface for accessing messages within a contextual messaging system, according to one embodiment. Once created, messages are not delivered to any individual, but rather are posted to a message queue which resides on the contextual messaging host server 911. Messages then become available to users within any relevant application and are accessed via screens contextual to the user's workflow. The full message view can be accessed by double-clicking the relevant message icon. The message view delivered by this action will vary based on the context. A list of messages meeting the message context will display. The messages appear in a list very similar in layout to a conventional email inbox. However, this context will vary for nearly every product, supplier or category selection. Each message type has a different detail (lower panel) layout and set of actions, based on previously established business rules. When the user selects a message the appropriate detail layout is displayed. The interface may include several view tabs, including summary 501, items 502, lists 504 and products 503. A user may select a particular view 508 within the products tab 503, and the selected view may include graphics 509 associated with each product. Based on a set of rules determining message type priority, icons (in this case within a messaging column) 510 display the status of each message view. A mouse-over message box 511 delivers more specific information regarding the nature of each message view. Each message can have additional product information included in the interface, such as category 505, manufacturer 506, and model 507.

Every message type has a read-only and a read-write mode, according to one embodiment. Only the original message author can edit or delete a previously submitted message. When edited, messages are resubmitted to the message queue. When deleted, the messages are permanently removed from the message queue. For other users, deleting a message only removes it from their current and related view contexts, but has no affect on other users' message queues.

FIG. 6 is an exemplary message context box within a contextual messaging system, according to one embodiment. Displayed are messages 601, as well as information 602 specific to a selected message. The information 602 specific to a selected message can include a client name 603, supplier 604 information, and scope 607. The message may contain a subject 605, details 606, and any related notes 608.

FIG. 7 is an exemplary message context box with multiple actions within a contextual messaging system, according to one embodiment. Actions 709 may be embedded within certain message types to enhance the user's ability to actively utilize the content within the message. Also displayed are messages 701, as well as information 702 specific to a selected message. The information 702 specific to a selected message can include a client name 703, supplier 704 information, discontinued product 707 information, and suggested replacement 708 for the discontinued product, as an example. The message may contain a subject 705, related notes 706, and actions 709.

Figure 8:
FIG. 8 is an exemplary message context box with a single action within a contextual messaging system, according to one embodiment.

FIG. 8 is an exemplary message context box with a single action within a contextual messaging system, according to one embodiment. Messages are displayed 801, as well as information 802 specific to a selected message. The information 802 specific to a selected message can include a client name 803, and product information 804, as an example. The message may contain a subject 805, related notes 806, and a single action 807.

All tasks described herein are part of one embodiment and are not intended to limit the scope of the invention.

A method and system for contextual messaging as utilized for decision support have been described. Although various embodiments have been described with respect to specific examples and subsystems, it will be apparent to those of ordinary skill in the art that the concepts disclosed herein are not limited to these specific examples or subsystems but extends to other embodiments as well. Included within the scope of these concepts are all of these other embodiments as specified in the claims that follow.

I claim:

1. A computer-implemented method, comprising:
receiving and storing information from an administrative client that establishes memberships of a plurality of clients to a common contextual messaging system;
receiving and storing nomenclature information from the administrative client that establishes a nomenclature for the common contextual messaging system;
receiving a plurality of messages from one or more of the plurality of clients;
determining a message context for each message using the nomenclature information;
clustering the messages based on the message context in a message database;

determining a current context associated with each request to access the plurality of messages from a plurality of users;

determining a message view for each request based on a correlation of the current context of the request with the message context of each message;

providing to a first device a first message view associated with the plurality of messages based on a first current context associated with a first request from a first user, the first request being from the first device; and providing to the first device a second message view associated with the plurality of messages based on a second current context associated with a second request from the first user, the second request being from the first device, the first message view being different from the second message view.

2. The computer-implemented method of claim 1, wherein message context comprises category, supplier, and product.

3. The computer-implemented method of claim 1, wherein authorization to create messages is determined by administratively controlled user permissions; and determining if the first client has adequate permission to create a message.

4. The computer-implemented method of claim 1, wherein messages are delivered based on a set of message delivery rules.

5. The computer-implemented method of claim 1, wherein messages are read-only or read-write.

6. The computer-implemented method of claim 1, wherein messages may be edited or deleted by a message author.

7. The computer-implemented method of claim 1, wherein messages may be deleted by a user other than a message author.

8. The computer-implemented method of claim 1, wherein message views contain programmatic actions.

9. The computer-implemented method of claim 1, wherein:
the plurality of messages includes a first message;
the first message view includes a first subset of information from the first message; and
the second message view includes a second subset of information from the first message, the first subset of information being different than the second subset of information.

10. The computer-implemented method of claim 1, wherein:
the plurality of messages includes a first message and a second message;
the first message view includes information from the first message but not the second message; and
the second message view includes information from the second message but not the first message.

11. The computer-implemented method of claim 1, wherein:
the first request is from a first application at the first device; and
the second request is from the first application at the first device.

12. A non-transitory computer-readable medium having stored thereon a plurality of instructions, said plurality of instructions when executed by a computer, cause said computer to perform:
receiving and storing information from an administrative client that establishes memberships of a plurality of clients to a common contextual messaging system;
receiving and storing nomenclature information from the administrative client that establishes a nomenclature for the common contextual messaging system;
receiving a plurality of messages from one or more of the plurality of clients;
determining a message context for each message using the nomenclature information;
clustering the messages based on the message context in a message database;
determining a current context associated with each request to access the plurality of messages from a plurality of users;
determining a message view for each request based on a correlation of the current context of the request with the message context of each message;
providing to a first device a first message view associated with the plurality of messages based on a first current context associated with a first request from a first user, the first request being from the first device; and
providing to the first device a second message view associated with the plurality of messages based on a second current context associated with a second request from the first user, the second request being from the first device, the first message view being different from the second message view.

13. The non-transitory computer-readable medium of claim 12, wherein message context comprises category, supplier, and product.

14. The non-transitory computer-readable medium of claim 12, wherein authorization to create messages is determined by administratively controlled user permissions; and wherein the plurality of instructions cause the computer to perform determining if the first client has adequate permission to create a message.

15. The non-transitory computer-readable medium of claim 12, wherein:
determining a current context includes, for each request, determining a current context of a workflow for the user issuing the request;
providing the first message view includes filtering the plurality of messages to provide a subset of the plurality of messages based on the first current context; and
providing the second message view includes filtering the plurality of messages to provide a second subset of the plurality of messages based on the second current context, the first and second subsets being different.

16. A non-transitory computer-readable medium according to claim 12, wherein:
the first request is from a first application at the first device; and
the second request is from the first application at the first device.

17. A system, comprising:
a contextual messaging host server;
a database that stores nomenclature, product and messaging information in communication with the contextual messaging host server; and
an administrative client in communication with the contextual messaging host server that establishes memberships of a plurality of clients to the common contextual messaging host server;
wherein the administrative client establishes a nomenclature for the common contextual messaging system; and
wherein the contextual messaging host server receives a plurality of messages from one or more of the plurality of clients, determines a message context for each message using the nomenclature information, clusters the messages based on the message context in a message database, determines a current context associated with each request to access the plurality of messages from a plurality of users, determines a message view for each request based on a correlation of the current context of the request with the message context of each message, provides a first message view associated with the plurality of messages based on a first current context associated with a first request from a first user and provides a second message view associated with the plurality of messages based on a second current context associated with a second request from the first user, the first message view being different from the second message view, the first request and the second request being from a first application at a first device.

18. The system of claim 17, wherein message contexts include category, supplier, and product.

19. The system of claim 17, wherein authorization to create messages is determined by administratively controlled user permissions.

20. The system of claim 17, wherein messages are delivered based on a set of message delivery rules.

21. The system of claim 17, wherein message views contain programmatic actions.

* * * * *